Sept. 1, 1942.  G. B. MARKLE, JR  2,294,677
SELF-LOCKING ARBOR FOR SUPPORTING TUBES FORMING
HEADLESS SPOOLS OR THE LIKE
Filed June 25, 1941
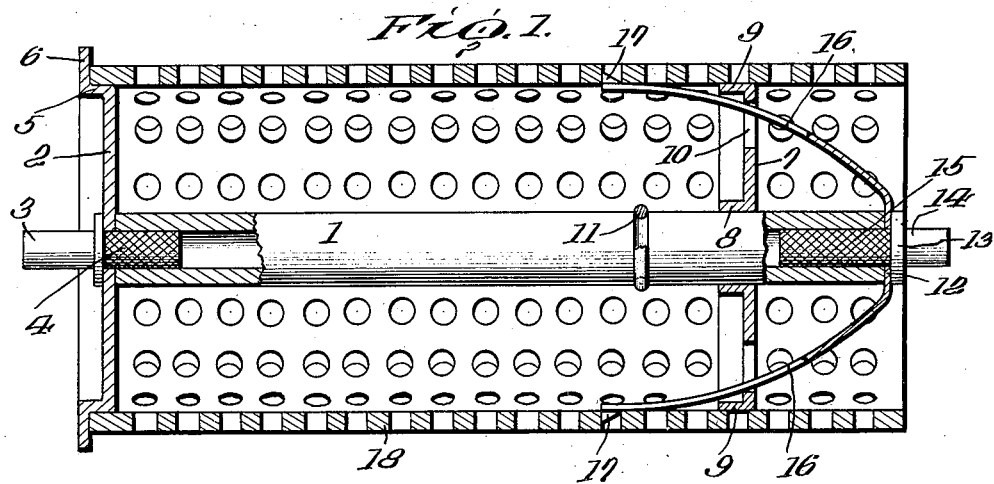
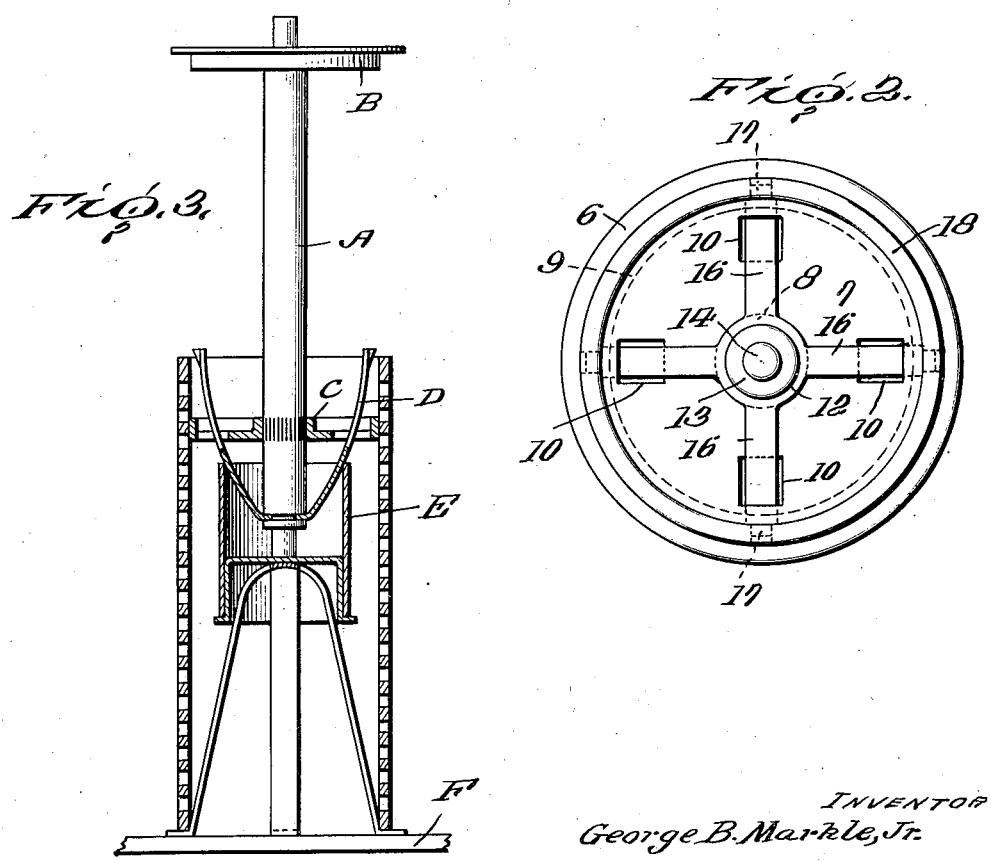
INVENTOR
George B. Markle, Jr.
By Pallisar, Wright & Pallisar
ATTORNEYS Patented Sept. 1, 1942

2,294,677

UNITED STATES PATENT OFFICE 2,294,677

SELF-LOCKING ARBOR FOR SUPPORTING TUBES FORMING HEADLESS SPOOLS OR THE LIKE

George B. Markle, Jr., Hazleton, Pa.

Application June 25, 1941, Serial No. 399,726

6 Claims. (Cl. 242—130)

This invention relates to certain new and useful improvements in a self-locking arbor for supporting tubes forming headless spools or the like and is a improvement on the construction disclosed in my application filed March 7, 1941, Serial No. 382,247, the object being to simplify the construction described in my application by utilizing one of the heads of the arbor for compressing the spring locking arms to release the spool or the like.

Another object of my invention is to provide an arbor with a fixed and a movable mounted head for supporting the spool, the movable head being so constructed that it will release the spool locking means when pressed inwardly, thereby enabling the arbor to be released when positioned on a pinboard as disclosed in the application of William H. Miller, filed May 20, 1941, Serial No. 394,357.

In the drawing:

Fig. 1 is a longitudinal section through an arbor constructed in accordance with my invention showing a spool in position thereon.

Fig. 2 is an end view of the arbor.

Fig. 3 is a detail section through a modified construction of arbor showing the spring arms engaged by a ring-like member of a pinboard for releasing the spool.

In the embodiment of my invention as herein shown, 1 indicates a metal tubular core having secured against one end thereof a centrally apertured circular flanged head 2 by a flanged collet 3. The collet is formed with a knurled portion 4 to one side of the flange adapted to be forced into the open end of the core 1 for securely fastening the head in position on the end of the core. The head 2 is formed with an annular flange 5 to provide a spool supporting surface and a shoulder 6 to provide a stop for the spool when being placed thereon.

Mounted on the core 1 adjacent the other end is a circular metal head 7 having a hub portion 8 slidably mounted on the core and provided with an annular flange 9 forming a spool supporting surface. The head is provided with spaced slots 10 for the purpose hereinafter described. The inward movement of the head 7 on the core 1 is limited by a stop ring 11 seated in an annular groove formed in the core 1.

Secured against the end of the core 1 is the hub portion 12 of a spider by a collet 13 having an annular flange 14 and a knurled portion 15 which is forced into the open end of the core as clearly shown, until the flange 14 engages the hub portion 12 of the spider so as to fasten the spider onto the end of the core and the collet in position on the core.

The spider is provided with a plurality of spring arms 16 extending inwardly through the slots 10 of the head 7 having lugs 17 at their free ends provided with inclined faces, to facilitate the placing of a spool thereon. The arms 16 are free to move centrally in the slots 10 of the head but their outward movement is limited by the end walls of the slots which are so positioned that the arms will be compressed as the head 7 is forced inwardly. These slots also form guideways for the arms 16 as they expand and contract and at the same time form a driving connection to relieve the strain on the arms. The outward movement of the head 7 is limited by the arms 16 of the spider and it will be seen that when the head is pushed inward either by a special constructed tool or a ring-like member of a pinboard the arms will be compressed to release the spool or the like.

The arbor herein shown and described is adapted to receive a perforated spool or the like 18 and when in position on the arbor an interlocking connection is formed between the spool and arbor so that the spool will rotate with the arbor. The lugs 17 on the arms 16 ride over the perforations of the spool as it is being positioned thereon but seat themselves when the end of the spool engages the stop shoulder 6 of the head 2.

In the modification illustrated in Fig. 3 the arbor is composed of a central core A having heads B and C fixed thereon; the head C being provided with slots to receive the spring locking arms D which are adapted to be engaged to release the spool by a ring-like member E carried by each pin of a pinboard F as clearly shown. The construction of the pinboard is disclosed in the application of William H. Miller, Serial No. 394,357, filed May 20, 1941, and the construction of the arbor is disclosed in my application Serial No. 382,247, filed March 7, 1941. From the above it will be seen that a pinboard with a ring-like member will operate the spool locking means of either construction illustrated as in one construction the ring-like member engages a movable head and in the other construction the springs to compress the springs to release the spool.

From the foregoing description it will be seen that the construction herein shown and described has all of the advantages set forth in my application Serial No. 382,247 and at the same time I use one of the heads to form the spring arms releasing means.

I claim:

1. An arbor for spools or the like comprising a core having a fixed and a movable head disposed thereon, the movable head being provided with slots, a plurality of spring arms carried by the core extending through the slots of said head for locking a spool on said arbor, said movable head being adapted to release said arms from said spool when moved longitudinally on said core.

2. An arbor for spools and the like comprising a core, a head fixed on one end of said core, a head slidably mounted on said core adjacent the other end thereof provided with slots, spring arms secured to said core having their free ends extending through the slots of said head for locking a spool on said heads, the slidably mounted head being adapted to move said arms out of engagement with said spool.

3. An arbor for spools and the like comprising a core having a fixed and a movable head carried thereby for supporting a spool or the like, a plurality of spring arms carried by said core for holding a spool in position on said arbor, the movable head of said arbor being adapted to compress said spring arms when moved longitudinally on said core to release the spool from said arbor.

4. An arbor for spools and the like comprising a tubular core, a head secured against one end of said core by a collet extending into said core, a spider provided with spring arms secured against the other end of said core by a collet extending into said core and a head movably mounted on said core having slots to receive said spring arms, said movable head being adapted to compress said spring when moved inwardly on said core.

5. An arbor for spools and the like comprising a core, a flanged head fixed to one end of said core, a movable head mounted on said core adjacent the other end thereof provided with slots, a spider carried by said core having spring arms extending through the slots of said head provided with projections at their ends adapted to interlock with the opening of a perforated spool when placed in position on said heads, means for limiting the inward movement of said head, said movable head being adapted to compress said spring arms to release the spool when moved longitudinally on said core.

6. An arbor for spools and the like comprising a core, a fixed and a movable head mounted on said core, a spring arm carried by said core for locking a spool on said heads, the movable head being adapted to release said spool when moved on said core.

GEORGE B. MARKLE, Jr.